(12) United States Patent
Strongin et al.

(10) Patent No.: US 6,321,302 B1
(45) Date of Patent: *Nov. 20, 2001

(54) STREAM READ BUFFER FOR EFFICIENT INTERFACE WITH BLOCK ORIENTED DEVICES

(75) Inventors: Geoffrey Strongin, Austin; Norm Hack, Pflugerville, both of TX (US)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/060,843

(22) Filed: Apr. 15, 1998

(51) Int. Cl.[7] .................................................. G06F 13/00
(52) U.S. Cl. .............................................. 711/138; 710/52
(58) Field of Search ................................ 711/3, 105, 106, 711/138, 133–135, 136, 159–160; 710/52–53, 56

(56) References Cited

U.S. PATENT DOCUMENTS

| | | | |
|---|---|---|---|
| 5,442,747 | 8/1995 | Chan et al. | 345/509 |
| 5,561,780 * | 10/1996 | Glew et al. | 711/170 |
| 5,586,294 | 12/1996 | Goodwin et al. | 711/137 |
| 5,664,148 * | 9/1997 | Mulla et al. | 711/138 |
| 5,692,168 | 11/1997 | McMahan | 712/237 |
| 5,708,794 * | 1/1998 | Parks et al. | 711/154 |
| 5,737,565 | 4/1998 | Mayfield | 711/213 |
| 5,740,398 * | 4/1998 | Quattromani et al. | 711/117 |
| 5,761,706 | 6/1998 | Kessler et al. | 711/118 |
| 5,870,599 | 2/1999 | Hinton et al. | 712/239 |
| 5,958,040 | 9/1999 | Jouppi | 712/207 |
| 5,963,981 * | 10/1999 | Martin | 711/170 |
| 6,032,225 | 2/2000 | Shiell et al. | 711/117 |
| 6,044,438 * | 3/2000 | Olnowich | 711/130 |
| 6,219,745 * | 4/2001 | Strongin et al. | 711/100 |

FOREIGN PATENT DOCUMENTS 6-348593 * 6/1993 (JP).
06-348593 * 12/1994 (JP).

* cited by examiner

Primary Examiner—Matthew Kim
Assistant Examiner—Denise Tran
(74) Attorney, Agent, or Firm—Conley, Rose & Tayon, PC; B. Noël Kivlin (57) ABSTRACT

A system is disclosed for improving the efficiency of data transactions to a non-cacheable address, or to a block-accessed device. A stream read buffer and associated logic is used to temporarily store the non-cacheable data, or to store large blocks of data from a block-accessed device. The stream read buffer loads the data upon the occurrence of certain predefined events, as determined by the associated state logic. Similarly, the stream read buffer flushes its contents when the stored data is not being accessed, or after the expiration of a particular time frame.

10 Claims, 4 Drawing Sheets

STREAM READ BUFFER FOR EFFICIENT INTERFACE WITH BLOCK ORIENTED DEVICES

BACKGROUND OF THE INVENTION

1. Field of the Invention

The present invention generally relates to computer systems which include components that are subject to cycles in which data is read, modified and written back by a central processing unit (CPU) or other system device. Still more particularly, the present invention relates to a computer system implementation in which non-cacheable data or data in block-oriented devices can be selectively read in relatively large blocks and temporarily stored in a stream read buffer.

2. Description of the Relevant Art

For most computer systems, the number of clock cycles required for a data access to a memory device depends upon the component accessing the memory and the speed of the memory unit. Most of the memory devices in a computer system are slow compared to the clock speed of the central processing unit (CPU). As a result, the CPU is forced to enter wait states when seeking data from the slower memory devices. Because of the relative slowness of most memory devices, the efficiency of the CPU can be severely compromised. As the operating speed of processors increases and as new generations of processors evolve, it is advantageous to minimize wait states in memory transactions to fully exploit the capabilities of these new processors.

In an effort to reduce wait states, it has become commonplace to include one or more cache memory devices in a computer system. A cache memory is a high-speed memory unit interposed in the memory hierarchy of a computer system generally between a slower system memory (and/or external memory) and a processor to improve effective memory transfer rates and accordingly improve system performance. The cache memory unit is essentially hidden and appears transparent to the user, who is aware only of a larger system memory. The cache memory usually is implemented by semiconductor memory devices having access times that are comparable to the clock frequency of the processor, while the system and other external memories are implemented using less costly, lower-speed technology.

The cache concept is based on the locality principle, which anticipates that the microprocessor will tend to repeatedly access the same group of memory locations. To minimize access times of this frequently used data, it is stored in the cache memory, which has much faster access times than system memory. Accordingly, the cache memory may contain, at any point in time, copies of information from both external and system memories. If the data is stored in cache memory, the microprocessor will access the data from the cache memory and not the system or external memory. Because of the cache memory's superior speed relative to external or system memory, overall computer performance may be significantly enhanced through the use of a cache memory.

A cache memory typically includes a plurality of memory sections, wherein each memory section stores a block or a "line," of two or more words of data. A line may consist, for example, of four "doublewords" (wherein each doubleword comprises four 8-bit bytes). Each cache line has associated with it an address tag that uniquely associates the cache line to a line of system memory.

According to normal convention, when the processor initiates a read cycle to obtain data or instructions from the system or external memory, an address tag comparison first is performed to determine whether a copy of the requested information resides in the cache memory. If present, the data is used directly from the cache. This event is referred to as a cache read "hit." If not present in the cache, a line in memory containing the requested word is retrieved from system memory and stored in the cache memory. The requested word is simultaneously supplied to the processor. This event is referred to as a cache read "miss."

In addition to using a cache memory during data retrieval, the processor may also write data directly to the cache memory instead of to the system or external memory. When the processor desires to write data to memory, an address tag comparison is made to determine whether the line into which data is to be written resides in the cache memory. If the line is present in the cache memory, the data is written directly into the line in cache. This event is referred to as a cache write "hit." A data "dirty bit" for the line is then set in an associated status bit (or bits). The dirty status bit indicates that data stored within the line is dirty (i.e., modified), and thus, before the line is deleted from the cache memory or overwritten, the modified data must be written into system or external memory. This procedure for cache memory operation is commonly referred to as "copy back" or "write back" operation. During a write transaction, if the line into which data is to be written does not exist in the cache memory, the data typically is written directly into the system memory. This event is referred to as a cache write "miss".

While cache memory devices have proven effective in reducing latency times in processors, there are certain memory devices which contain data that cannot be cached in a cache memory. Video and graphics cards are examples of devices that contain data that typically is not cacheable. CPU accesses to memory devices which contain non-cacheable data thus tends to be inefficient because the data cannot be stored in cache memory, but instead must be directly accessed from the slower memory device. Thus, despite the fact that cache memories do improve system efficiency and reduce CPU latency, there are a number of components in computer systems which are being accessed in an inefficient manner because the data stored in these devices is non-cacheable.

In addition to the problem with non-cacheable data, there are a number of devices which fall into the category of being "block-accessed" devices. A block-accessed device may be defined as a device which operates more efficiently when data is accessed in large blocks as compared to situations in which data is read as individual bytes or words. Some devices have a block-accessed nature inherently, such as DRAM memory devices. It is preferable to read data from DRAM in large blocks because of the high latency required for the first data access. Subsequent accesses to DRAM, by contrast, have a very high bandwidth transmission. Consequently, if a large block of data in DRAM is accessed, a very high average band width transmission is obtained. Conversely, if the access is to a single byte in DRAM, a low average bandwidth results. While DRAM is given as an example of a block-access device, one skilled in the art will understand that many other structures have similar operation, and would similarly benefit from a system which is capable of accessing large blocks of data.

Thus, there exist various block-accessed devices in computer systems which ideally should be accessed in large blocks whenever possible to maximize system efficiency. Despite the readily apparent advantages of accessing large blocks of data in block-accessed devices, there currently is no support structure in existing PC systems to efficiently handle data transfers involving block-accessed devices.

SUMMARY OF THE INVENTION

The present invention solves the shortcomings and deficiencies of the prior art by constructing a computer system which implements a stream read buffer (SRB) for temporary storage of data from block-oriented components or from components that contain non-cacheable data. Associated with the SRB is state logic for controlling operation of the SRB. The computer system preferably includes a CPU core connected to a local bus interface unit (BIU) by a CPU local bus. The BIU preferably connects to peripheral devices and to a memory control unit (MCU) through a system bus. In the preferred embodiment, the SRB includes a plurality of buffers with a length of N bytes. The stream read buffer preferably is incorporated in the CPU local bus interface unit (BIU), but may also be located in a separate buffer coupled to the system bus (and external to the CPU core), or as a dedicated part of cache memory. The SRB may be used when accessing addresses which are non-cacheable, to temporarily store an efficient block of data from the accessed device for subsequent modify and write operations.

Data preferably is read in large blocks from the device to be accessed and is loaded into the stream read buffer. Data can be loaded into the stream read buffer based upon a variety of criteria. In one embodiment, data is loaded into the SRB whenever a read cycle is made to a non-cacheable address. In an exemplary embodiment of the present invention, the bus interface unit (BIU) may include programmable registers for indicating address ranges that should be loaded into the SRB, when accessed. In this embodiment, the BIU receives a read request and compares the address to be read with the address registers to determine if the data to be read should be loaded into the SRB. Preferably, the address ranges in the address registers may be modified either by a programmer, or by state logic circuitry associated with the SRB which monitors accesses to addresses.

After the data has been stored temporarily in the stream read buffer, the data subsequently is written back to the original address preferably in large blocks. In accordance with the principles of the present invention, data can be written back to the original address based upon a number of different criteria. One criteria that can be used for writing back data in an SRB is time. Thus, after a certain number of clock signals, data from the SRB is written back. The period of time may be either fixed or programmable. Alternatively, data can be written back from an SRB if the SRB is not accessed for a predetermined number of instructions, or if no active read or write requests exist for data in the SRB.

An alternative trigger for writing back data from an SRB may be either a data read cycle or data write cycle to a non-cacheable address, as determined by the state logic associated with the SRB. Thus, if a cycle is made to a non-cacheable address that is not already contained in the SRB, the SRB would respond by writing back the existing contents of the SRB. Alternatively, for video or graphics applications, a video refresh signal may be used to initiate a write back of the SRB.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
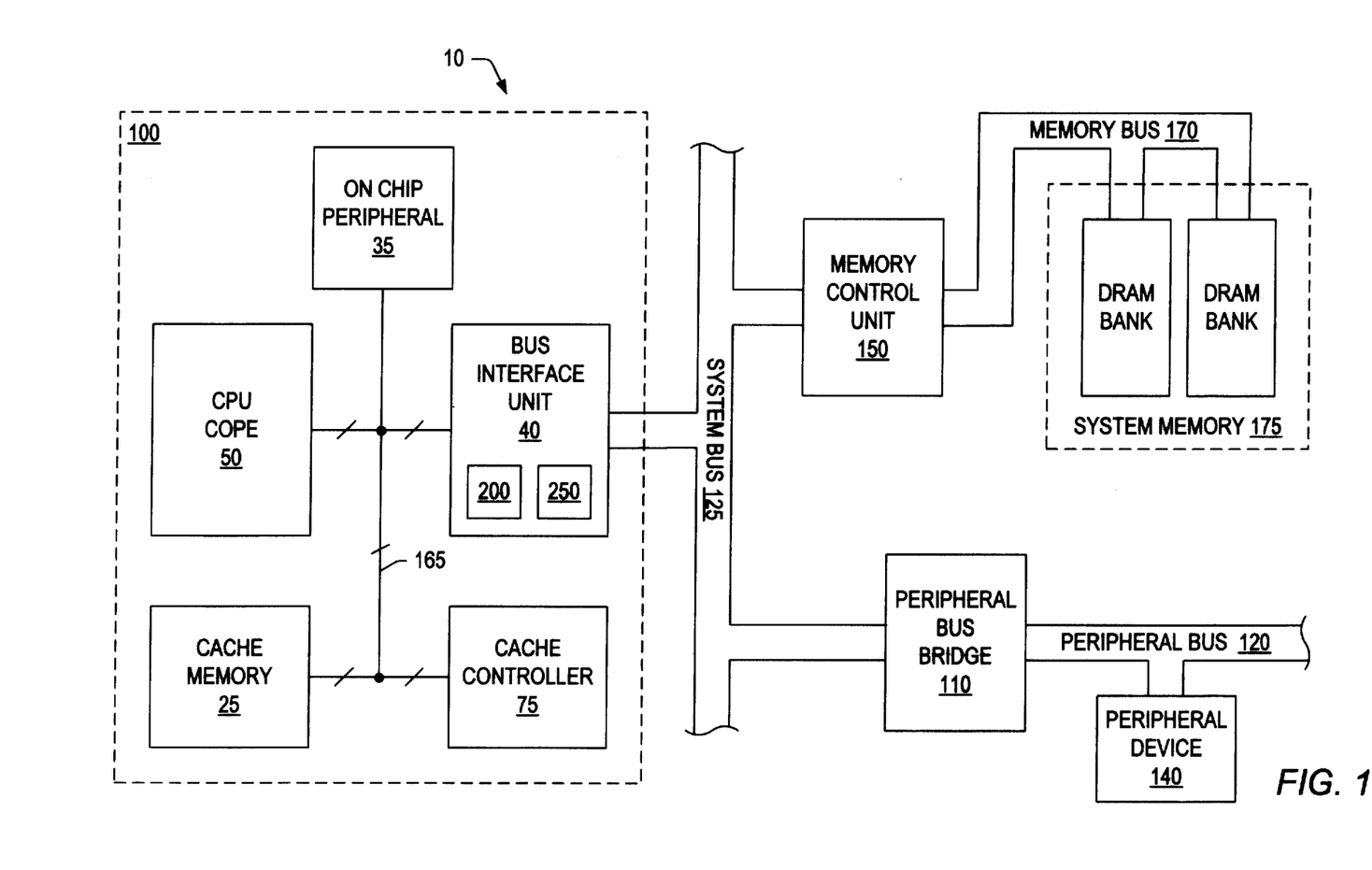
FIG. 1 is a schematic block diagram of an exemplary computer system implementing a stream read buffer in accordance with the principles of the present invention.

Turning now to the drawings, FIG. 1 is a block diagram of a general computer system 10 for implementing the present invention. The computer system 10, in accordance with generally known conventions, includes a microprocessor or "processor" 100 which functions as the brains of the computer system 10. Processor 100 preferably includes a CPU core 50 coupled to a cache memory 25 and a cache controller 75 by a local bus 165. CPU core 50, cache memory 25, and cache controller 75 are coupled to a system bus 125 via a local bus interface unit (BIU) 40. An on chip peripheral device 35 may also connect to the local bus. As one skilled in the art will understand, any of the peripheral components of the processor 100, such as cache memory 25, may be located externally from the processor 100. Similarly, other components shown as external to the processor 100 in FIG. 1 may be integrated as part of microprocessor 100. As will be understood by one skilled in the art, in such a situation the system bus 125 may form part of the CPU local bus 165.

The computer system 100 also preferably includes a peripheral bus bridge 110 and a memory controller 150, all connected to the processor 100 via system bus 125 and local bus interface 40. The peripheral bus bridge 110 provides an interface between an external peripheral bus 120 and the system bus 125 and orchestrates the transfer of data, address and control signals between these busses in accordance with known techniques.

As shown in FIG. 1, an external system memory 175 also preferably couples to system bus 125 through memory controller 150. The memory control unit 150 of FIG. 1 couples to the system bus 125 and to a memory bus 170 to control memory transactions between system components and system memory 175. The system memory 175 typically includes banks of dynamic random access memory (DRAM) circuits. In FIG. 1, two DRAM banks are shown for purposes of illustration, with the understanding that additional banks may be added if desired. The DRAM banks, according to normal convention, comprise the working memory of the integrated processor 100. The memory bus 170, which interconnects the DRAM circuits to the memory controller 150, includes memory address lines, memory data lines, and various control lines. In accordance with the exemplary embodiment of FIG. 1, the memory control unit 150 may also connect to a read only memory (ROM) device (not shown) via the memory bus 170. The ROM device may store the BIOS (basic input/output system) instructions for the computer system. As one skilled in the art will understand, the BIOS ROM may be located elsewhere in the computer system if desired.

An alternate peripheral device 140, such as a DMA controller or other device, also may couple to peripheral bus 120. In its illustrated form, computer system 100 embodies a single processor, single-cache architecture. It is understood, however, that the present invention may be adapted to multi-processor and/or multi-cache systems. It is further understood that a variety of other devices may be coupled to peripheral bus 120. The peripheral bus may comprise a PCI bus, an ISA bus, an EISA bus, or any other standard bus. Peripheral device 140 may be illustrative of a variety of bus mastering devices. Exemplary alternate bus masters include disk drives, CD ROM units, and local area network (LAN) devices.

The CPU core 50 is illustrative of, for example, a Pentium-compatible microprocessor, with reduced instruction set computer (RISC) operations, such as the assignee's "K-5" superscalar microprocessor. The CPU local bus 165 is exemplary of a Pentium-compatible style local bus. The CPU local bus 165 includes a set of data lines, a set of address lines, and a set of control lines (not shown individually). Alternatively, the CPU core 50 and CPU local bus 165 may support other instruction set operations, without departing from the principles of the present invention.

Thus, according to normal convention, the processor 100 couples to other peripheral computer components through one or more external buses, such as system bus 125, peripheral bus 120, and memory bus 170. Various peripheral devices (such as peripheral device 140) may reside on these busses. These peripheral devices may include memory devices, network cards or other structures which could be the target of a read or write request by the CPU core 50 or some other system component.

Referring still to FIG. 1, the present invention preferably includes a cache memory 25 and a cache controller 75. As noted in the Background of this Application, the cache memory 25 functions as an intermediate storage device to store recently accessed data, as long as that data is determined to be cacheable. The cache controller 75 includes address tag and state information. The address tag indicates a physical address in system memory 175 or in external memory (such as may be represented by peripheral device 140, for example) corresponding to each entry within cache memory 25. In accordance with normal convention, each entry within cache memory 25 is capable of storing a line of data. Cache controller 75 also preferably includes an address tag and state logic circuit (not shown specifically) that contains and manages the address tag and state information, and a comparator circuit (not shown specifically) for determining whether a cache hit has occurred. Although not shown, the cache controller 75 may include other logical elements, including for example a snoop write-back circuit that controls the write-back of dirty data within cache memory 25. It will be appreciated by those skilled in the art that cache controller 75 may contain other additional conventional circuitry to control well-known caching functions such as various read, write, update, invalidate, copy-back, and flush operations. Such circuitry may be implemented using a variety of specific circuit configurations. Examples of such specific circuit configurations may be found in a host of publications of the known prior art, including U.S. Pat. No. 5,091,875 issued to Rubinfeld on Feb. 25, 1992 and U.S. Pat. No. 5,091,876 issued to Sachs et al. on Feb. 25, 1992.

Figure 4:
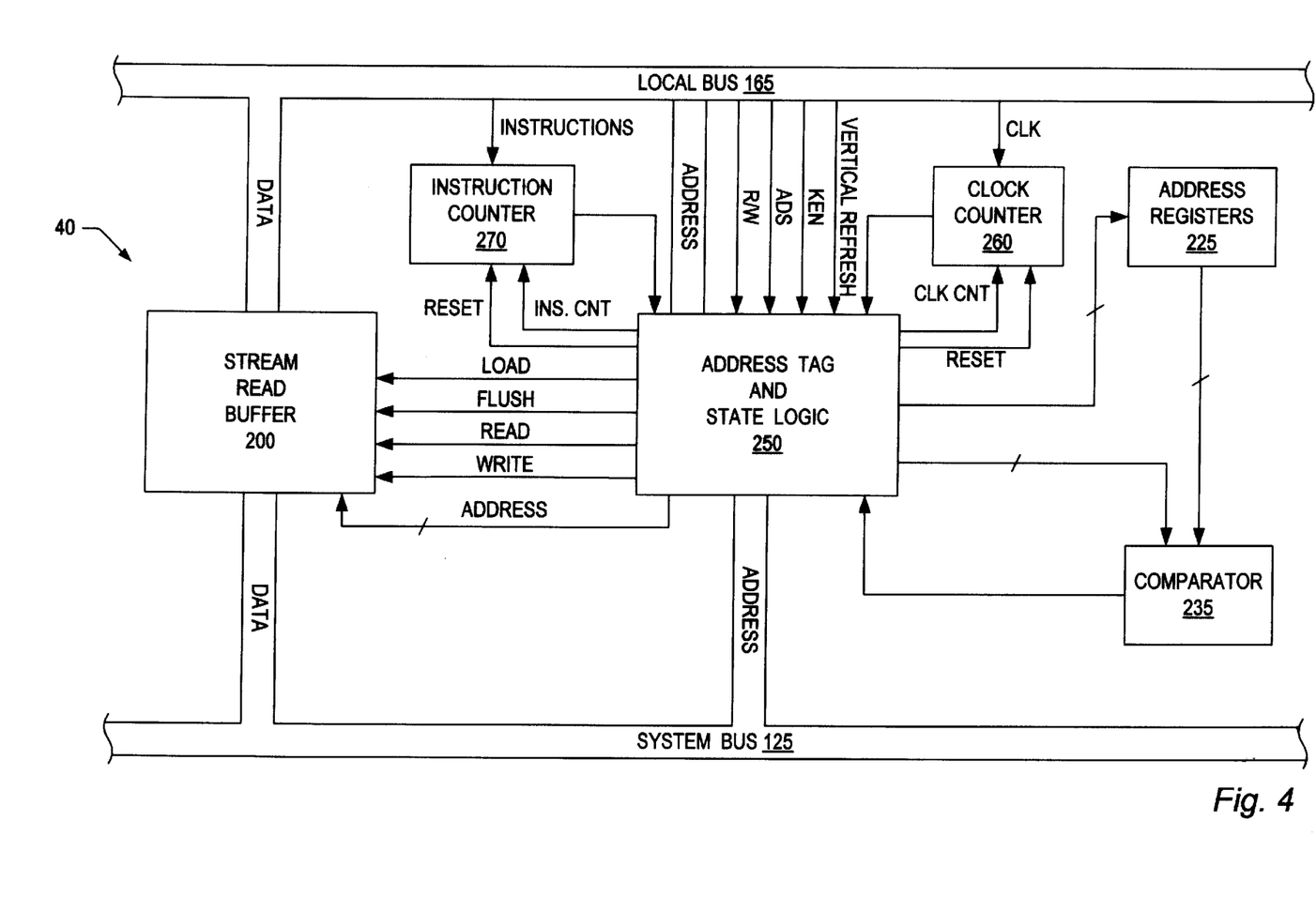
FIG. 4 is a schematic block diagram illustrating an exemplary stream read buffer and associated state logic configuration for implementation in the bus interface unit of FIG. 1.

Referring now to FIGS. 1 and 4, the bus interface unit (BIU) 40 preferably includes a stream read buffer 200 and associated tag and state logic circuitry 250 in accordance with the preferred embodiment of the present invention. The BIU 40 couples to both the local bus 165 and the system bus 125 for orchestrating the transfer of address, data and control signals between these respective busses. In accordance with the principles of the present invention, the BIU 40 monitors certain control signals and address ranges to load the stream read buffer (SRB) 200, and to cause the stream read buffer to write its contents back to the original address location.

The stream read buffer 200 preferably comprises one or more data buffers with a length of N bytes. The stream read buffer 200 functions to temporarily store large blocks of data from a non-cacheable address and/or from block-accessed devices when those devices are the subject of a read cycle. When the BIU 40 determines that a block-accessed device is the target of a read request, the BIU 40 preferably causes a large block of the block-accessed device to be read into the stream read buffer 200 to improve the efficiency of the data transfer, with the expectation that the data stored in the stream read buffers will be subsequently accessed again. Similarly, if the BIU 40 determines that a read request is made to a non-cacheable location in the computer system, the BIU preferably causes the stream read buffer 200 to load a block of data from the target device to improve the efficiency of the data transfer.

FIG. 4 is an exemplary embodiment of one way in which the stream read buffer 200 may be implemented in a system component such as the BIU 40, with the understanding that many other implementations may be developed, including both software and hardware configurations. As one skilled in the art will understand, modifications can be made to the configuration of FIG. 4 to adapt it for use in other components not coupled to the local and system bases. The implementation of FIG. 4 preferably comprises stream read buffer 200, address tag and state logic 250, address registers 225, comparator 235, clock counter 260, and instruction counter 270. One skilled in the art will understand that any or all of these components may be located in other locations in the computer system without departing from the principles of the present invention.

As shown in FIG. 4, the stream read buffer 200 couples via a data bus to both the local bus 165 and to the system bus 125. In this fashion, the stream read buffer 200 is capable of loading and writing data to and from the system bus 125, while being readily accessible by the CPU core 50 (FIG. 1) via the local bus 165. The stream read buffer preferably receives an address signal, a LOAD signal, a FLUSH signal, a WRITE signal, and a READ signal from the address tag and state logic 250. In response to the LOAD signal, the stream read buffer loads data signals from the system bus 125 for temporary storage. In response to a FLUSH signal, the stream read buffer 200 drives out its contents onto the system bus 125 for routing back to the original storage site. If desired, the address tag and state logic 250 may specify an address range to the stream read buffer 200 to cause the stream read buffer 200 to only load or flush certain portions of its contents. In response to a READ signal (or WRITE signal) and a valid address signal from the state logic 250, the stream read buffer 200 drives out data corresponding to the requested address onto the local bus 165. Similar read and write cycles can result in data being driven into the system bus 125 if the cycle is initiated by an external bus master.

Referring still to FIG. 1 and 4, the instruction counter 270 preferably counts all instructions appearing on the local bus 165. The instruction counter 270 may comprise part of some other local bus component, such as an instruction control circuit. The instruction counter 270 receives a reset signal from the state logic 250 whenever a read or write access is made to the stream read buffer 200. Preferably, the instruction counter 270 is loaded with a predetermined count value by an appropriate signal (INS CNT) from the state logic 250. Alternatively, the predetermined value can be set by a programmer, or a fixed value may be used. The instruction counter 270 preferably provides an output to the state logic 250 signal when the instruction count equals the predetermined count value.

Similarly, the clock counter 260 preferably counts clock signals on the local bus 165. The clock counter 260 receives a reset signal from the state logic 250 whenever a read or write access is made to the stream read buffer 200. Like the instruction counter, the clock counter 260 preferably is loaded with a predetermined count value (CLK CNT) by the state logic 250, or the predetermined value can be set by a programmer, or a fixed value may be used. The clock counter 260 provides an output signal to the state logic 250 when the number of clock signals on the local bus 165 equal the predetermined count value.

The address registers 225 may be used to identify address ranges of devices for which data is to be loaded into the stream read buffer 200 in response to a data access under certain conditions. The address registers 225 preferably are programmable by the state logic 250, or by some external logic to indicate the address ranges in the computer system which are to load data into the stream read buffer 200 during a data access by the CPU core or other bus master device. When the state logic 250 receives an address signal on the local bus 165, the address signal is routed to comparator 235. Comparator 235 also receives address signals from the address registers 225, and in response determines whether the current transaction is targeted to an address which is to be loaded in the stream read buffer 200.

The address tag and state logic 250 preferably receives a plurality of control signals from the local bus 165 and/or system bus 125, including a read/write (R/W) signal, an address status (ADS) signal, a cache enable (KEN) signal, and a vertical refresh (VERTICAL REFRESH) signal. FIG. 4 only illustrates local bus control signals for the sake of simplicity. The address tag and state logic 250 also preferably receives address signals from the local bus, and both transmits and receives address signals on the system bus 125.

In accordance with normal convention, the ADS signal indicates the beginning of a new bus cycle. Similarly, the write/read (W/R) line typically indicates whether a particular bus cycle is a write or read request. The cache enable (KEN) signal indicates whether the target address is cacheable or not. Lastly, the vertical refresh signal indicates that a vertical refresh has been initiated by the video or graphics associated with the system, during which the raster scan moves from the last pixel in a previous screen to the first pixel in the subsequent screen. In response to receipt of the various control signals and address signals, the address tag and state logic 250 controls operation of the stream read buffer 200.

The address tag and state logic circuit 250 indicates a physical address of the memory devices in the computer system corresponding to each line entry within the SRB 200. As will be better understood from the following, the address tag and state logic 250 preferably monitors cycles executing on local bus 165 and system bus 125 and detects the initiation of a memory cycle (i.e., read or write cycle) by the CPU core or any alternate bus master device in the computer system 100. It is noted that such a cycle could be initiated by peripheral device 140 or by other local bus peripherals, as well as the CPU core 50.

Referring still to FIGS. 1 and 4, several methods may be implemented for determining when to load data into the SRB 200 and when to flush data from the SRB 200 back to the originating address. One triggering event for loading the SRB may be during any non-cacheable read. Thus, according to this method, during any normal data read cycle where the read (R/W) signal is asserted after an address status (ADS) signal, and where the cache enable (KEN) is not asserted, then the cycle is treated as a non-cacheable read by the state logic 250, and a block of data from the target address is loaded into the SRB 200 by assertion of the LOAD signal by the state logic 250. In the preferred embodiment, the block of data is large enough to fill the SRB 200, although one skilled in the art will understand that smaller data blocks may be loaded, and the SRB 200 may be partitioned.

A second method for implementing a load operation of the SRB 200 would be to monitor for any read cycle while the CPU core 50 was in a special mode, as may for example, be indicated by the status of a SPECIAL signal (not shown specifically) on the local bus 165. In this embodiment, the CPU core would be capable of entering a state during which the SPECIAL signal was asserted to initiate an SRB load. In this embodiment, the status of the cache enable (KEN) signal is a don't care. In response to assertion of the SPECIAL signal, the state logic 250 asserts a LOAD signal.

A third possibility for initiating a load of the stream read buffer 200 is to monitor for a non-cacheable read while in a special mode. Accordingly, an SRB load would occur when the SPECIAL signal is asserted, the cache enable (KEN) is not asserted, and the read (R/W) is asserted.

A fourth method implementing an SRB load could be based upon address ranges. In this embodiment, the SRB 200 is loaded only during read cycles to a particular address range, identified by address registers 225 and comparator 235. If a read cycle is requested from an address identified by address registers 225, the SRB 200 receives a LOAD signal from state logic 250. The addresses in registers 225 preferably are programmable to permit the values to be modified if warranted. As an alternative to the use of address registers, the target device could respond to a read cycle with a signal indicating whether the SRB should be loaded. Other techniques and triggers for loading the SRB 200 will be apparent to one skilled in the art, and the implementation of other methods and techniques for loading an SRB is intended to fall within the scope of the teachings and techniques disclosed herein.

Similarly, numerous techniques are available for flushing data from the stream read buffer 200 back to the corresponding memory address. In a first implementation, data is written back from the SRB 200 after the data has been resident in the SRB for a predetermined number of clock signals. In this embodiment, the clock counter 260 is programmed with a count value (CLK CNT), preferably by the state logic 250. When the number of clock cycles equals the count value, the clock counter 260 provides an output signal to the state logic to initiate a flush of the SRB 200.

A second method for flushing the SRB 200 is to have the BIU 40 monitor the local bus 165 and system bus 125 for a data read miss of the SRB 200, which is made to a non-cacheable address. Thus, if a data read cycle occurs, which is not satisfied by the contents of the SRB, and which is made to a non-cacheable address, the SRB 200 would be flushed. This method is based upon the probability that the contents of the SRB are no longer needed if a read miss occurs to the SRB.

A third method for flushing the SRB would be upon the occurrence of a data write miss of the SRB, which was made to a non-cacheable address. Thus, if a data write cycle occurs, which is not satisfied by the contents of the SRB, and which is made to a non-cacheable address, the SRB 200 would be flushed.

A fourth technique for flushing the stream read buffer 200 is based upon the number of instructions executed between read and write cycles to the SRB. The instruction counter 270 preferably is programmed by the state logic 250 with an instruction count number. Whenever a read or write cycle is directed to the SRB, the instruction counter 270 is reset by state logic 250. If the instruction counter 270 counts a number of instructions equal to the programmed instruction count number, the instruction counter 270 transmits a signal to the state logic 250, which in turn causes the SRB 200 to be written back to the corresponding memory address.

A fifth alternative for writing back the contents of the SRB is based upon current transactions to the SRB. If no active read or write cycles exist to the SRB 200, the state logic 250 causes the contents of the SRB 200 to be flushed back to the associated memory device.

A sixth technique for flushing the SRB is directed to situations where the SRB data is expected to comprise video or graphics information. In this embodiment, the contents of the SRB 200 are flushed when a vertical refresh of the monitor is initiated, as indicated by receipt of the VERTICAL REFRESH signal by state logic 250. In this manner, data can be read and modified, and then written back to video memory prior to the time it is required for the next screen.

The above description is directed to a configuration where the stream read buffer 200 and related state logic 250 are physically located in the bus interface unit 40. As mentioned above, the invention is not meant to be restricted by the physical location of the SRB 200 and state logic 250. Thus, the embodiment of FIG. 4 could be adapted by one skilled in the art for implementation in another part of the computer system 10.

Figure 2:
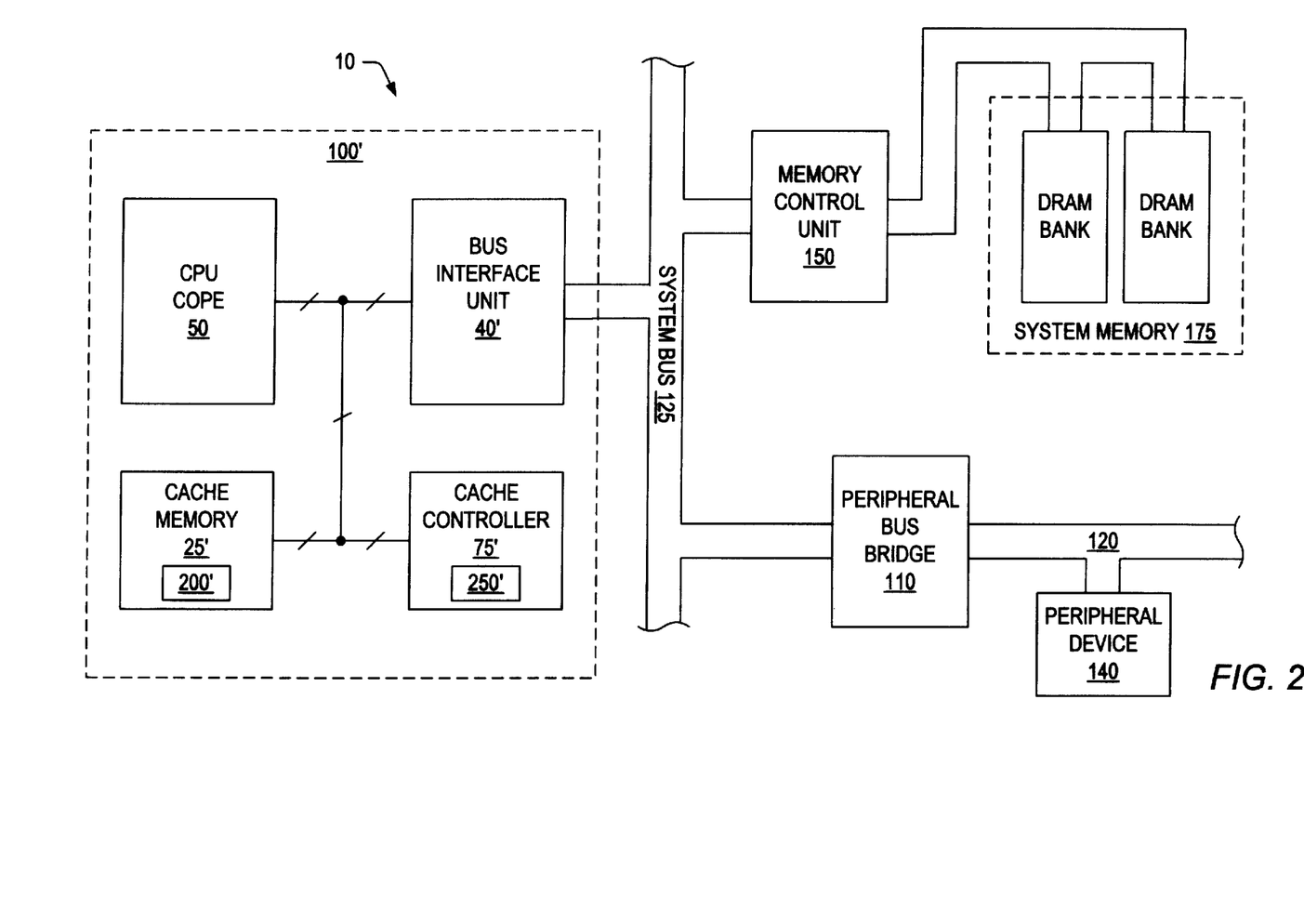
FIG. 2 is a schematic block diagram depicting an alternative embodiment of implementing the stream read buffers of the present invention in a computer system.

FIG. 2 illustrates an example of a computer system where the SRB 200N and state logic 250N are located in the cache memory and cache controller, respectively. In FIG. 2, the same numbers have been used for components which are identically represented in FIGS. 1 and 2. Components that have been modified are indicated by a prime after the original number. Thus, the cache memory 25' is shown with an SRB 200' as part of its contents. In this embodiment, the cache memory includes a reserved portion reserved for use as a stream read buffer. Similarly, cache controller 75' includes state logic 250' for controlling the portion of the cache memory 25' reserved for the stream read buffer.

Figure 3:
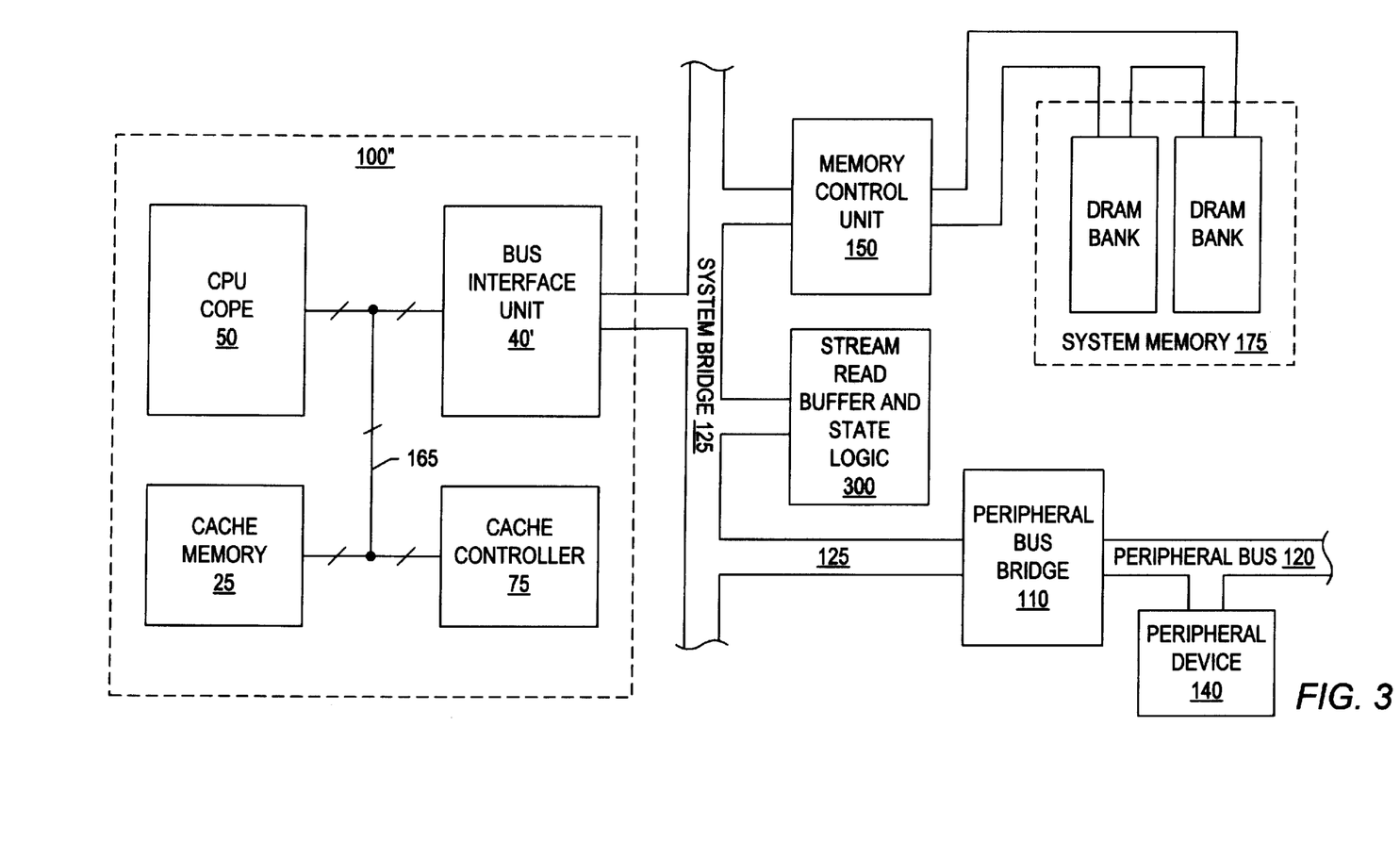
FIG. 3 is a schematic block diagram depicting yet another alternative embodiment for implementing stream read buffers in a computer system.

FIG. 3 depicts the stream read buffer and state logic 300 as being resident on the system bus 125, and external to local bus 165. In this embodiment, the stream read buffer and state logic 300 monitors cycles on the system bus 125 to determine when to load data into the stream read buffer and when to flush the contents of the SRB. In all other respects, the operation of the SRB parallels operation of the SRB 200 and associated state logic 250.

Numerous variations and modifications will become apparent to those skilled in the art once the above disclosure is fully appreciated. It is intended that the following claims be interpreted to embrace all such variations and modifications.

What is claimed is:

1. A system for temporarily storing a block of non cacheable data, comprising:
    a CPU core;
    a local bus interface unit coupled between said CPU core and a system bus;
    a memory device coupled to said system bus, said memory device including addresses which contain non-cacheable data;
    wherein said local bus interface unit includes:
        state logic coupled to received control signals produced by the CPU core and indicative of a non-cacheable read cycle directed to a target address within the memory device, wherein the state logic is configured to produce a LOAD signal in response to the control signals;
        a stream read buffer for temporary storage of non-cacheable data, wherein the stream read buffer is coupled to receive the LOAD signal and configured to respond to the LOAD signal by loading the block of non-cacheable data from the target address via the system bus; and
        comparator logic for determining whether an address of a current transaction is targeted to an address which is to be loaded in the stream read buffer; and
        an instruction counter for counting a number of instructions which have been executed since a previous cycle to the stream read buffer, and wherein the data is flushed from the stream read buffer the count in said instruction counter exceeds a predetermined value.

2. A system as in claim 1, wherein said stream read buffer includes a plurality of buffers with a length of N bytes.

3. A system as in claim 1, wherein said CPU core is capable of operating in a special mode, and wherein the state logic is coupled to receive a SPECIAL signal when the CPU is operating in the special mode, and wherein the state logic is configured to produce the LOAD signal in response to the SPECIAL signal.

4. A system as in claim 1, wherein said bus interface unit includes address registers, and wherein said address registers identify addresses used to implement a stream read buffer mode.

5. A system as in claim 4, wherein the address registers are programmable and can be modified during system operation.

6. A system as in claim 1, wherein the bus interface unit includes a clock counter for counting a number of clock signals since data is loaded in the stream read buffer, and wherein data is flushed from the stream read buffer when the clock counter count reaches a predetermined value.

7. A system as in claim 1, wherein data is flushed from the stream read buffer when a read cycle is made to a non-cacheable address that is not currently stored in the stream read buffer.

8. A system as in claim 1, wherein data is flushed from the stream read buffer when a write cycle is made to a non-cacheable address that is not currently stored in the stream read buffer.

9. A system as in claim 1, wherein data is flushed from the stream read buffer when no cycles are made to the stream read buffer within a predetermined period of time.

10. A system as in claim 1, wherein said stream read buffer is flushed after assertion of a vertical refresh signal.

* * * * *

UNITED STATES PATENT AND TRADEMARK OFFICE
CERTIFICATE OF CORRECTION

PATENT NO.   : 6,321,302 B1
DATED        : November 20, 2001
INVENTOR(S)  : Geoffrey Strongin and Norm Hack It is certified that error appears in the above-identified patent and that said Letters Patent is hereby corrected as shown below:

<u>Column 10,</u>
Line 14, please change "received" to -- receive --.
Line 30, please change "a" to -- the --.
Line 32, please insert -- when -- after "buffer".

Signed and Sealed this

Twenty-eighth Day of May, 2002

*Attest:*

*Attesting Officer*

JAMES E. ROGAN
*Director of the United States Patent and Trademark Office*